March 6, 1934.  L. McDOW  1,949,725
THRESHING MACHINE
Filed June 23, 1928   2 Sheets-Sheet 2
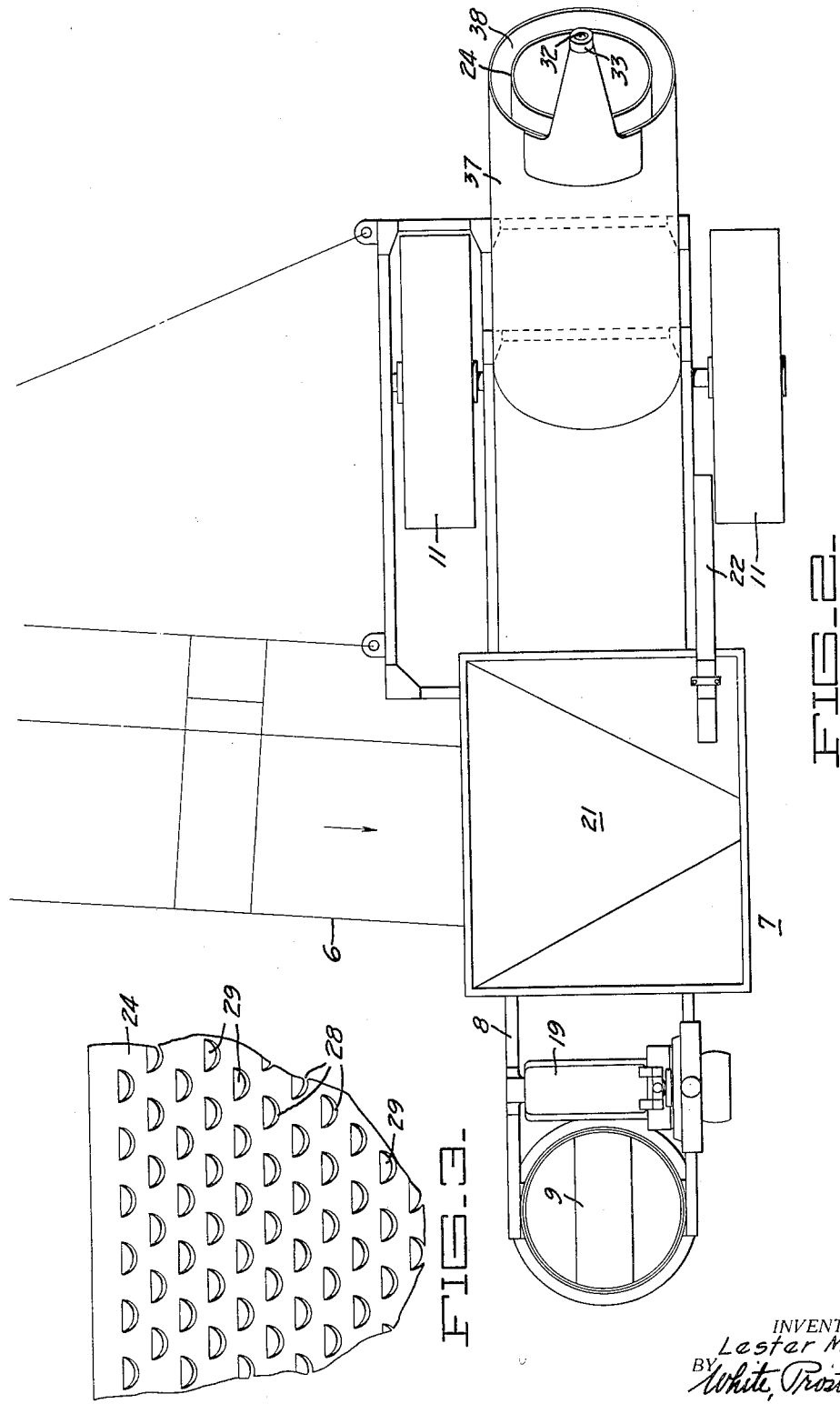
INVENTOR
Lester McDow
BY White, Prost Fryer
ATTORNEYS Patented Mar. 6, 1934

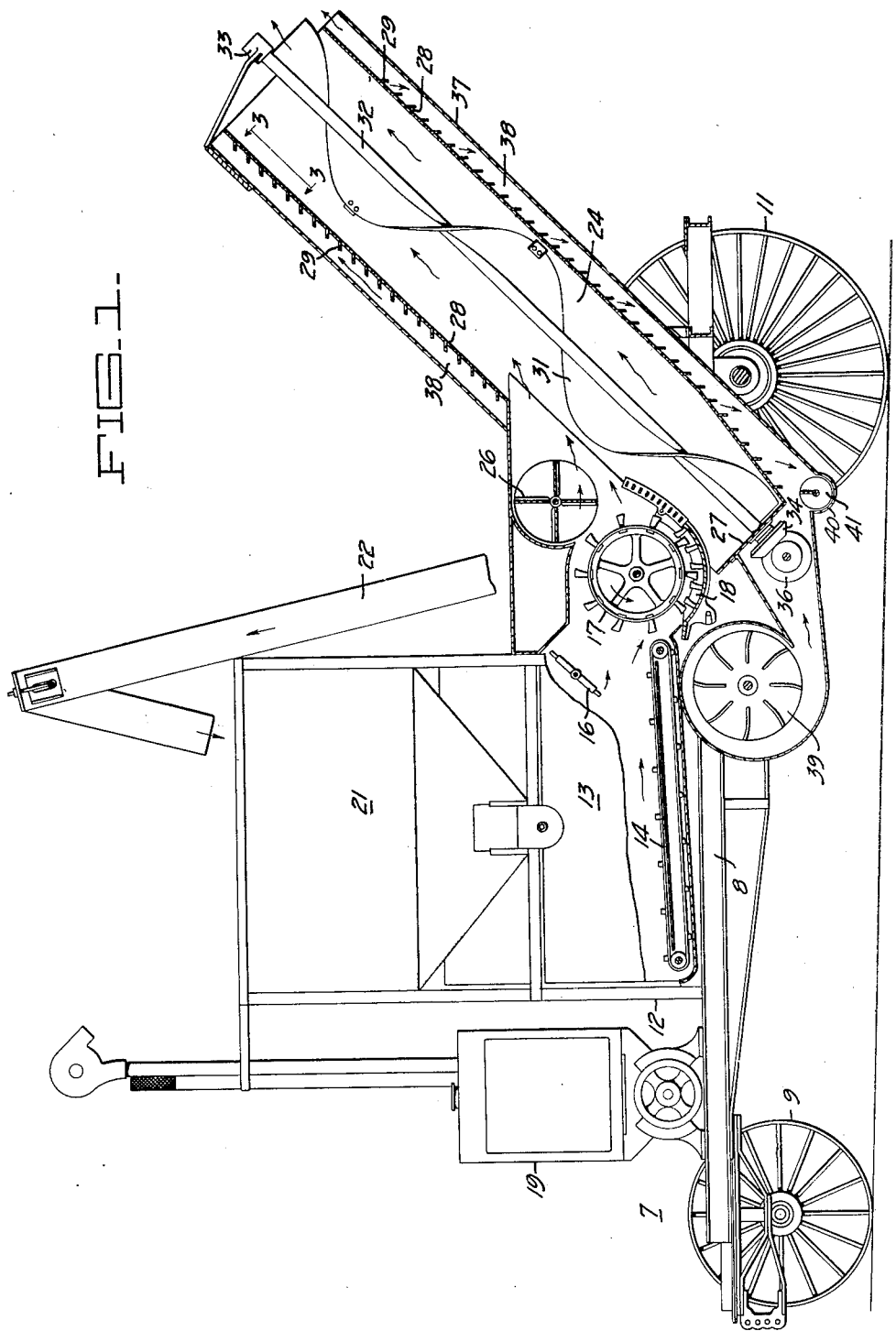

1,949,725

UNITED STATES PATENT OFFICE 1,949,725

THRESHING MACHINE

Lester McDow, Stockton, Calif., assignor, by mesne assignments, to Caterpillar Tractor Co., San Leandro, Calif., a corporation of California Application June 23, 1928, Serial No. 287,739

6 Claims. (Cl. 130—23)

My invention relates to threshing machinery and is particularly concerned with separating or threshing mechanisms; for example, separator units of combined harvester threshers.

An object of my invention is to improve the separating mechanism of a threshing machine.

Another object of my invention is to simplify the mechanism for handling grain which has been passed through a cylinder and concaves.

A further object of my invention is to provide a grain separating means in which full advantage is taken of gravity.

The foregoing and other objects are attained in the embodiment of the invention shown in the drawings, in which Fig. 1 is a side elevation of the separator portion of my harvester-thresher with a portion broken away to show the interior thereof.

Fig. 2 is a plan of a harvester-thresher built in accordance with my invention.

Fig. 3 is a fragmentary view showing in elevation a portion of the cylindrical casing.

In its preferred form, the separator of my invention includes a frame carrying an inclined cylindrical casing which is perforated to permit the passage of grain kernels and which is provided with a helicoidal auger to propel grain through said casing.

In the embodiment of my invention illustrated herein, there is usually provided a harvester including a header, indicated at 6, for cutting the grain and delivering it to the threshing machine generally designated by the numeral 7, and including a frame 8 supported by ground engaging wheels 9 and 11 and adapted to be propelled over a field of grain to be harvested. On the framework is mounted a superstructure 12 including a feeder house 13 enclosing a feeder 14 of the usual kind. In the feeder house is a down beater 16 for facilitating the passage of grain from the feeder into a cylinder 17 cooperating with one or more concaves and grates 18 in the customary manner. The cylinder and other moving parts of the mechanism in the preferred form are driven by an internal combustion engine 19 mounted at the forward end of the frame and connected by suitable means to the operating parts. Directly above the feeder house and forming part of the superstructure 12 is a bulk grain bin 21 for receiving grain kernels discharged by an elevator 22 of the ordinary type.

Grain which is cut by the header unit is discharged into the feeder house 13 onto the feeder 14 and is carried in the direction of the arrows past the down beater 16 into the rapidly revolving cylinder 17 which, in co-operation with the concaves 18, severs the grain kernels from the straw in the usual manner.

Instead of utilizing multitudinous and complicated separating mechanisms for treating the grain after it is discharged from the cylinder and concaves, I have provided a very simple apparatus which employs largely the effect of gravity to handle the grain efficiently.

A cylindrical casing 24 is mounted on the frame 8 and is preferably inclined at a considerable angle to the horizontal so that the entire discharge of grain from the cylinder and concaves is freely received. As an aid to this discharge, there is provided a grain beater 26 mounted in the superstructure and driven to advance the grain. The lower end of the casing 24 is preferably closed by a bulkhead 27 while the upper end is left open. Intermediate its ends, the casing 24 is provided with a plurality of perforations 28 of sufficient size to permit the ready passage of a grain kernel. Since it is expedient to have a baffle adjacent each aperture, I preferably punch the casing, which usually is of metal, to provide a plurality of lunar apertures each of which is afforded an adjacent semi-circular baffle 29. The baffles are preferably turned at such an angle to the surface of the casing that they offer no obstruction to the passage of grain kernels.

To propel the grain through the casing 24, I have preferably situated therein an auger 31 of helicoidal form which is carried on a central shaft 32. The upper end of the shaft is mounted in a journal 33 while the lower end passes through the bulkhead 27 and is provided with a bevel gear 34 meshing with another gear 36 connected to the driving mechanism. The operating speed of the auger is related to the operating speed of the cylinder so that the discharge of the cylinder is taken care of efficiently.

Grain which is propelled through the casing 24 by the auger 31 is violently agitated and shaken so that it is in a light, fluffy, loose condition. This is conducive to gravital separation of the grain kernels from the mass of straw. The stripped straw progresses to the open end of the casing and is discharged from the machine, while the kernels pass through the apertures 28.

To receive the kernels, I preferably surround the casing 24 with a coaxial, cylindrical housing 37, conveniently of sheet metal, mounted on the frame 8. An annular space 38 is thus left between the casing and the housing. As an aid to the separation of the grain, there is provided at a convenient point of the frame 8 a fan blower 39 driven from the engine 19. Air discharged by the blower passes the bulkhead 27 at the lower end of casing 24 and enters the annular chamber 38. The air flows upwardly into the interior of the casing through the apertures 28 and is properly directed by baffles 29. This current of air increases the efficiency of the separating operation and further assists in keeping the straw in a light, fluffy condition. The spent air escapes at the upper end of the mechanism adjacent the termination of auger 31. The grain kernels, which flow counter to the air current, fall gravitally to a receptacle 40 formed at the lower portion of the housing 37 and are carried by a cross auger 41 into the elevator 22 which transports them to the bulk grain bin 21.

In the threshing machine, of my invention, there is not only afforded an extremely simple and efficient mechanism for making the separation of the grain kernels from the grain straw, but there is also provided a mechanism which is economical to manufacture and maintain.

It is to be understood that I do not limit myself to the form of machine shown and described herein, as the invention as set forth in the following claims, may be embodied in a plurality of forms.

I claim:

1. In a threshing machine, a separator, comprising a cylindrical casing having apertures through which grain can discharge, means for propelling grain through said casing, and means for directing air currents through said apertures in opposition to the discharge of grain.

2. In a threshing machine, a separator, comprising an inclined cylindrical casing having apertures therein, means for propelling grain through said casing, a cylindrical housing surrounding said casing and forming an annular chamber, and means for blowing air through said chamber.

3. In a threshing machine, a separator, comprising a cylindrical casing having apertures therein, a cylindrical housing surrounding said casing to provide an annular chamber, baffles in said chamber adjacent said apertures, means for forcing air into said chamber, and means for propelling grain through said casing.

4. In a threshing machine, a frame, an apertured casing mounted at an incline on said frame, a cylinder and concaves mounted on said frame adapted to discharge grain into said casing, means mounted on an incline on said frame and surrounding said casing to form an annular chamber, rotatable means in said casing for propelling grain therethrough, and means for causing a current of air to pass through said chamber and said apertured casing.

5. In a threshing machine, a frame, an open ended casing mounted on an incline on said frame, said casing having apertures therein intermediate its ends, a rotatable shaft journaled in said casing, a helicoidal auger mounted on said shaft, a cylindrical housing mounted on said frame and surrounding said casing to form an annular chamber about said casing, and means for causing a current of air to flow through said chamber, said apertures, and said casing.

6. In a threshing machine characterized by the absence of vibrating separator shoes and screens, grain threshing mechanism, and separator mechanism for effecting separation of grain kernels and straw from grain threshed by said threshing mechanism; said separator mechanism consisting essentially of an inclined tubular casing having one end adjacent said threshing mechanism to receive the grain kernels and the straw from said threshing mechanism, and having apertures through which the grain kernels can pass, the opposite end of said casing being open to allow discharge of straw, a rotatable screw conveyor in said casing for conveying material therein in a direction away from said threshing mechanism toward said open end of the casing and to facilitate separation of the straw from the grain kernels, an inclined chute member below said casing and adapted to conduct said kernels gravitally, said inclined member forming a chamber with the wall of said casing, baffles in said chamber and formed integral with said casing adjacent its apertures, and means including a fan for directing a current of air through said apertures in opposition to the discharge of kernels therethrough, and into said casing to blow out the straw through said open end of the casing, said baffles being so positioned with respect to said apertures and the direction of air flow as to deflect the air through said apertures.

LESTER McDOW.